United States Patent
Verbeek et al.

(10) Patent No.: US 11,472,616 B2
(45) Date of Patent: Oct. 18, 2022

(54) METAL BALL LOCKING TIE ASSEMBLY INCLUDING CUSHION

(71) Applicant: Panduit Corp., Tinley Park, IL (US)

(72) Inventors: Michael B. Verbeek, Crown Point, IN (US); Joshua H. Nudelman, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/305,354

(22) Filed: Jul. 6, 2021

(65) Prior Publication Data

US 2022/0033153 A1 Feb. 3, 2022

Related U.S. Application Data

(60) Provisional application No. 63/058,020, filed on Jul. 29, 2020.

(51) Int. Cl.
*B65D 63/08* (2006.01)
*F16L 3/233* (2006.01)

(52) U.S. Cl.
CPC .............. *B65D 63/08* (2013.01); *F16L 3/233* (2013.01)

(58) Field of Classification Search
CPC ........ B65D 63/08; B65D 63/02; B65D 63/00; B65D 63/10; F16L 3/233
See application file for complete search history.

(56) References Cited

U.S. PATENT DOCUMENTS

| | | | |
|---|---|---|---|
| 4,366,602 A | 1/1983 | Conlon et al. | |
| 5,103,534 A * | 4/1992 | Caveney | B65D 63/08 24/20 R |
| 5,291,637 A | 3/1994 | Meyers | |
| 5,850,674 A | 12/1998 | Jansen | |
| 6,076,235 A | 6/2000 | Khokhar | |
| 7,866,007 B2 * | 1/2011 | DeBerry | B65D 63/08 24/20 R |
| 7,930,805 B2 * | 4/2011 | Bulanda | B65D 63/08 24/20 R |
| 8,225,461 B2 * | 7/2012 | Bulanda | B65D 63/08 24/21 |
| 9,009,923 B2 | 4/2015 | Rouleau et al. | |
| 9,309,719 B2 | 4/2016 | Sylvester et al. | |
| 9,457,942 B2 | 10/2016 | Mayo et al. | |
| 9,587,433 B2 | 3/2017 | Sylvester et al. | |
| 9,783,350 B2 | 10/2017 | Mayo et al. | |
| 9,878,835 B2 | 1/2018 | Winter | |
| 10,093,465 B2 | 10/2018 | Rufty et al. | |
| 2009/0265895 A1 | 10/2009 | Box | |

\* cited by examiner

*Primary Examiner* — Anita M King
(74) *Attorney, Agent, or Firm* — Christopher S. Clancy; James H. Williams; Peter S. Lee

(57) ABSTRACT

A metal ball locking tie assembly is provided that includes a cushioning component that provides an integrated compliant element, thus allowing for the use of the metal ball locking tie assembly across non-compliant bundles.

12 Claims, 6 Drawing Sheets

METAL BALL LOCKING TIE ASSEMBLY INCLUDING CUSHION

CROSS-REFERENCE TO RELATED APPLICATION(S)

This application claims benefit to U.S. Provisional Patent Application No. 63/058,020, filed Jul. 29, 2020, the entirety of which is hereby incorporated by reference herein.

FIELD OF TECHNOLOGY

This disclosure relates to a metal ball locking tie (MLT) assembly including a cushioning component for enabling more effective use as a bundling tool across more use cases, and especially on use cases when bundling around non-compliant components.

BACKGROUND

Metal ball locking cable ties (MLTs) offer a simple, effective, and fast solution for securing components, such as cables. A common characteristic of MLTs is the need for a tensioning movement in one direction, and then a release of the tension by an anti-tensioning movement in the opposite direction to achieve a locking state of the MLT. So typically, the components being bundled by the MLT must be a compliant bundle that allow for some amount of "give" to allow for the tensioning and anti-tensioning movements that are needed to achieve the locked state. If the MLT is being applied around a non-compliant (e.g., rigid) bundle of component(s), the anti-tensioning movement for locking the MLT is not available and the MLT will remain loose and fail to provide adequate locking capabilities. If the MLT does lock properly it will be loose and many times it does not lock at all. As most poles, pipes, and conduits do not have compliance characteristics, the application of typical MLTs as a securing tool is limited.

SUMMARY

This disclosure relates to a MLT assembly including a cushioning component to provide an integrated compliant element, thus allowing for application across non-compliant bundles.

According to an embodiment, a metal ball locking tie assembly is disclosed. The metal ball locking tie assembly comprising a body, a head assembly comprising a housing and a metal ball housed within the housing, wherein the body is configured to be received through the head assembly, and, a cushioning component covering at least an under side of the head assembly.

DETAILED DESECRIPTION

This disclosure relates to a MLT assembly including a cushioning component to provide an integrated compliant element, thus allowing for application across non-compliant bundles. With the rapid growth and global implementation of 5G infrastructure, there is a need to install data and antenna enclosures to both greenfield and brownfield vertically mounted poles. The MLT assembly including the cushioning component may, for example, now be used to secure such bundle components in the installation of the 5G infrastructure.

Figure 1:
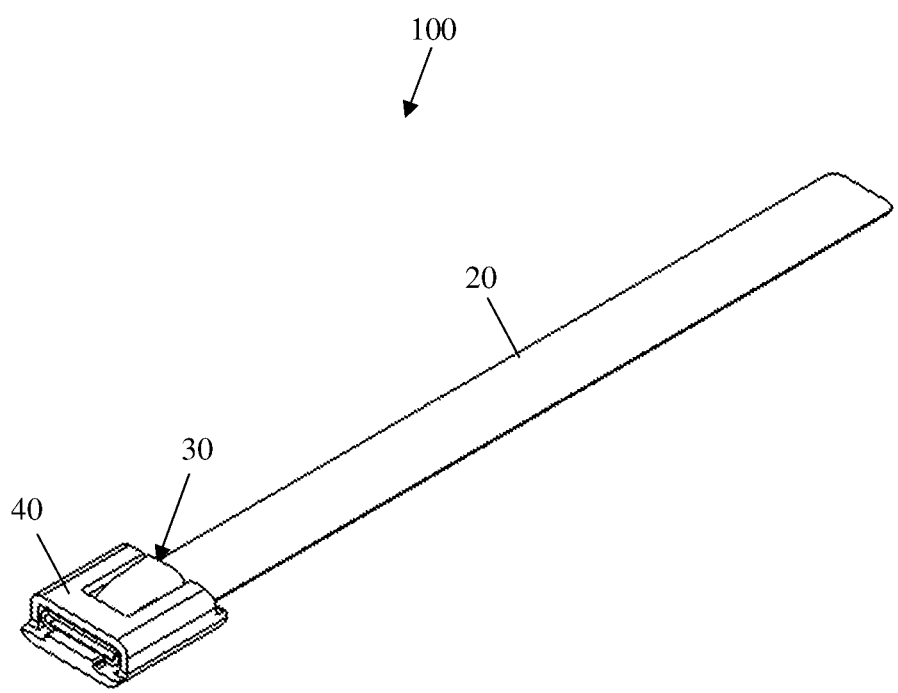
FIG. 1 is a perspective view of a metal ball locking tie assembly including a cushioning component, according to an embodiment of this disclosure.
Figure 2:
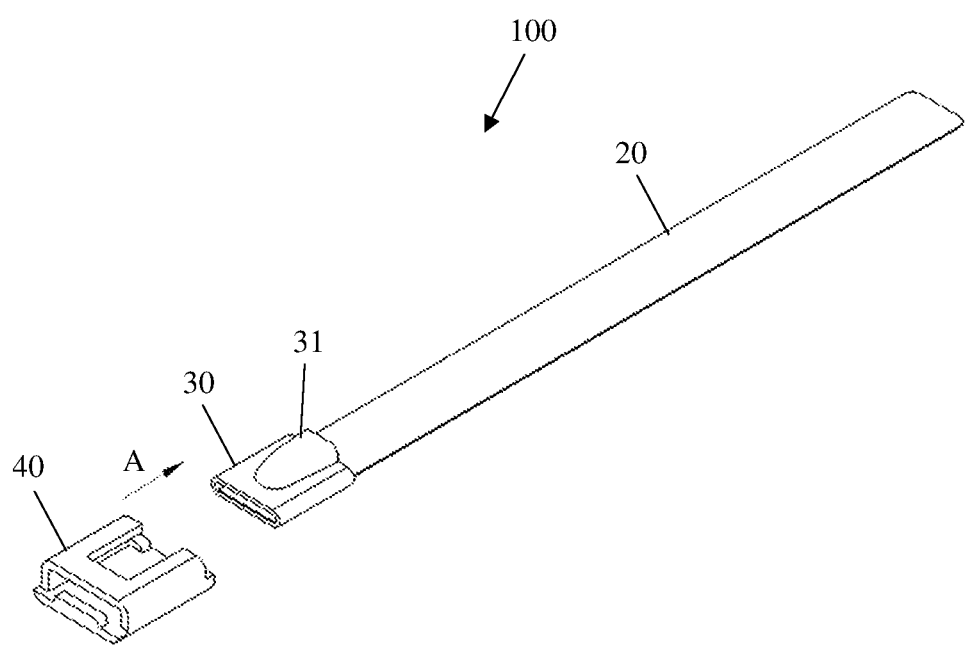
FIG. 2 is an exploded view of the MLT assembly shown in FIG. 1.

FIG. 1 shows the MLT assembly 100 in an assembled state according to an exemplary embodiment. The MLT assembly 100 includes a body 20 and a head assembly 30. The body 20 is an elongated strap member made from, for example, a metal, polymer, or other material with a sufficient tensile strength for bundling components. The head assembly 30 is made, for example, from a metal material. As shown in FIG. 2, the head assembly 30 includes a housing 31 shaped to hold one or more metal balls within an inner housing. The metal balls are configured to move bi-directionally with the tension and anti-tension movements, as described in more detail with reference to FIGS. 4A-4B.

The MLT assembly 100 also includes a cushioning component 40, where the cushioning component 40 is configured to fit over the head assembly 30. As shown in FIG. 2, the cushioning component 40 is a molded component that is molded to take on a shape (e.g., sleeve shape) that allows it to slide over the head assembly 30 in the direction A, and conform to the geometry of the head assembly 30 when attached. The cushioning component 40 is made from a flexible/pliable material such as a polymer, elastomer, or rubberized compound, where the selection of the material may be dependent on the compression required for the desired tensile strength, load, and/or environmental aspects relating to the installation scenario. A thickness of the cushioning component 40 (e.g., portion below the head assembly) may be directly proportional to a size of the body 20, or otherwise related to an intended application size of the bundle around which the MLT assembly 100 is intended to be secured around. In other embodiments, the thickness of the cushioning component 40 may be a predetermined thickness selected according to an intended application of the MLT assembly 100.

With the attachment of the cushioning component 40 to the head assembly 30 of the MLT assembly 100, the MLT assembly 100 may be applied to secure a non-compliant bundle and the cushioning component 40 will compress to provide the necessary compliance, allowing for the tension and anti-tensioning movements for locking the ball elements inside the housing 31 of the head assembly 30.

Figure 3A:
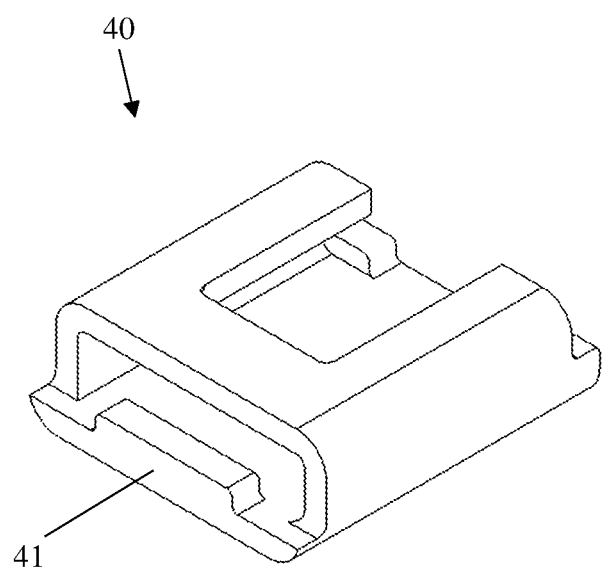
FIG. 3A is a first perspective view of the cushioning component shown in FIG. 1.
Figure 3B:
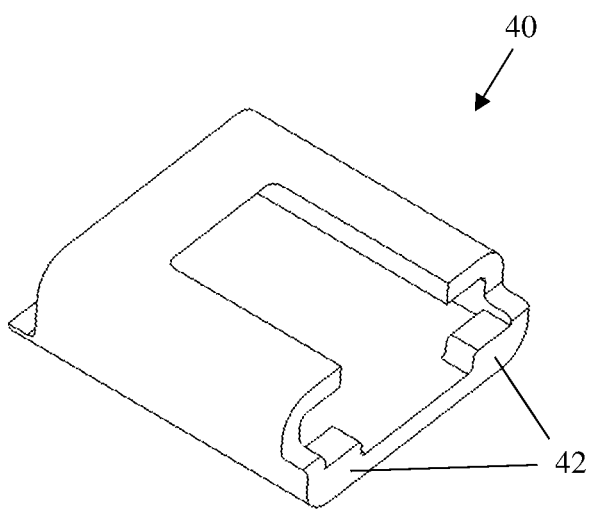
FIG. 3B is a second perspective view of the cushioning component shown in FIG. 1.

FIG. 3A shows a front perspective view of the cushioning component 40, showing a view of a front stop member 41. The front stop member 41 is included to assist in preventing the cushioning component 40 from sliding past a front portion of the head assembly 30 more than intended in an assembled position (e.g., assembled position shown in FIG. 1). FIG. 3B shows a back perspective view of the cushioning component 40, showing a view of a back stop member 42. The back stop member 42 is included to assist in preventing the cushioning component 40 from sliding past a back portion of the head assembly 30 more than intended in the assembled position.

Figure 4A:
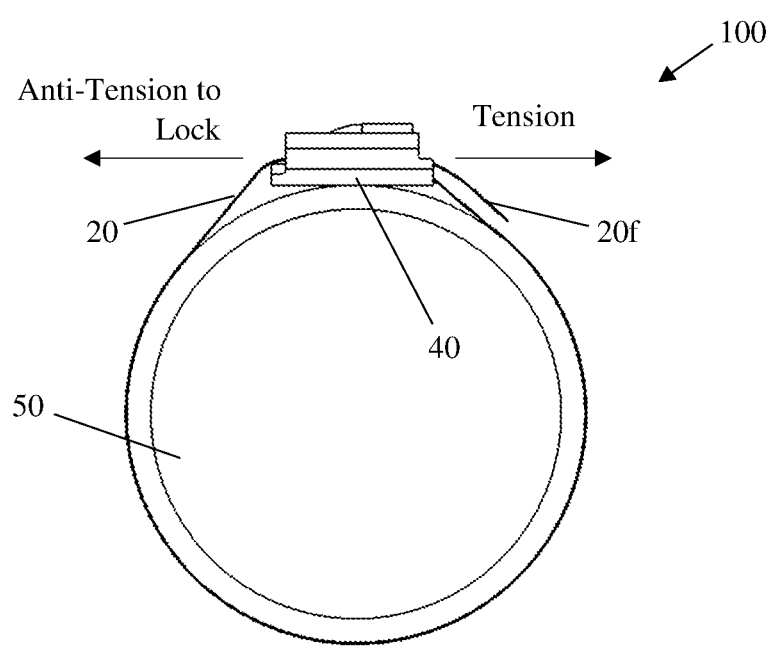
FIG. 4A is a side view of the MLT assembly secured to a bundle component, according to an embodiment of this disclosure.

FIG. 4A shows a side view of the MLT assembly 100 during an operation of the MLT assembly 100. When a front portion 20f of the body 20 (i.e., portion of the body 20 that has been routed through the head assembly 30) is pulled in the tensioning movement, a tension is applied to the MLT assembly 100 as it secures around the exemplary bundle 50 (e.g., the bundle 50 may be representative of one or more cables, pipes, or other conduit components). During the tensioning movement of the front portion 20f of the body 20, the metal balls within the housing 31 are allowed to freely move inside the housing.

With the tension applied, the cushioning component 40 is compressed to conform, at least partially, around the bundle 50. The compression of the cushioning component 40 allows for further travel of the body 20 in the tensioning movement than if the cushioning component 40 was not present or if the cushioning component 40 was made from a more rigid material that did not allow for compression. Then with the release of the tension on the front portion 20f of the body 20, the cushioning component 40 is allowed to expand and thus provide an opposite tension for moving the body 20 in the anti-tensioning movement, which causes the metal balls within the housing 31 to adjustably abut against an inner surface of the housing 31 and results in the locking of the MLT assembly 100. Thus the release of the compression from the cushioning component 40 allows for enough anti-tension movement to engage the locking mechanism of the metal balls within the housing 31, while still keeping a tight and secure grip on the bundle 50.

Figure 4B:
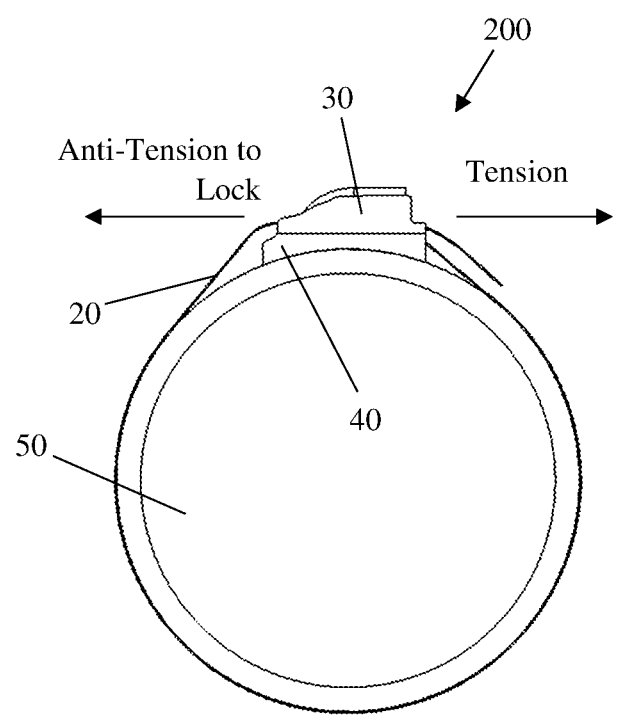
FIG. 4B is a side view of the MLT assembly secured to a bundle component, according to an alternative embodiment of this disclosure.

According to alternative embodiments, the cushioning component 40 may be a molded component that slides directly onto the head assembly 30. The cushioning component 40 may also be overmolded directly onto the head assembly 30 or adhered to the bottom surface of the head assembly 30 using an adhesive or tape, as shown in FIG. 4B. In these alternative embodiments, the shape of the cushioning component 40 may take on the form of a pad of polymer, elastomer, or rubberized compound adhered to the bottom surface of the head assembly 30.

The MLT assembly 100 offers a quick, easy, and effective solution for securing bundles in a variety of environments that were not possible using other typical metal ball locking ties. The MLT assembly 100 provides a more efficient installation process that only requires a short compression and expansion to allow the metal ball locking mechanism of the MLT assembly 100 to travel from the tensioning position to the locking position while maintaining a secure grip on the bundle being secured.

Furthermore, while the particular embodiments described herein have been shown and described, it will be obvious to those skilled in the art that changes and modifications may be made without departing from the teachings of the disclosure. The matter set forth in the foregoing description and accompanying drawings is offered by way of illustration only and not as limitation. The actual scope of the disclosure is intended to be defined in the following claims when viewed in their proper perspective.

What is claimed is:

1. A metal ball locking tie assembly comprising:
   a body;
   a head assembly comprising a housing and a metal ball housed within the housing, wherein the body is configured to be received through the head assembly; and
   a cushioning component covering at least an under side of the head assembly.

2. The metal ball locking tie assembly of claim 1, wherein a thickness of the cushioning component is proportional to a size of the body.

3. The metal ball locking tie assembly of claim 1, wherein the cushioning component is a pad attached to a bottom surface of the head assembly using an adhesive.

4. The metal ball locking tie assembly of claim 1, wherein the cushioning component is comprised of at least one of a polymer, elastomer, or a rubberized compound.

5. The metal ball locking tie assembly of claim 1, wherein the cushioning component comprises a sleeve for covering at least a top portion and a bottom portion of the head assembly.

6. The metal ball locking tie assembly of claim 5, wherein the cushioning component further comprises a front stop member located at a front portion of the cushioning component and a back stop member located at a back portion of the cushioning component.

7. The metal ball locking tie assembly of claim 1, wherein the head assembly includes at least two metal balls inside the housing.

8. The metal ball locking tie assembly of claim 1, wherein the head assembly is made from a metal material.

9. The metal ball locking tie assembly of claim 1, wherein the body is made from a same material as the head assembly.

10. The metal ball locking tie assembly of claim 1, wherein the body is made from a different material as the head assembly.

11. The metal ball locking tie assembly of claim 1, wherein the body is formed in a shape of a solid elongated strap.

12. The metal ball locking tie assembly of claim 1, wherein the head assembly is made from a different material as the cushioning component.

* * * * *